(12) United States Patent
Druga et al.

(10) Patent No.: US 12,070,052 B2
(45) Date of Patent: Aug. 27, 2024

(54) SYSTEM AND METHOD FOR CONTINUOUS MICROWAVE-ASSISTED EXTRACTION OF BIOACTIVE AGENTS FROM BIOMASS

(71) Applicants: SinnovaTek, Inc., Raleigh, NC (US); North Carolina State University, Raleigh, NC (US)

(72) Inventors: Michael Druga, Raleigh, NC (US); Amanda Vargochik, Raleigh, NC (US); Josip Simunovic, Raleigh, NC (US)

(73) Assignees: SinnovaTek, Inc., Raleigh, NC (US); North Carolina State University, Raleigh, NC (US)

( * ) Notice: Subject to any disclaimer, the term of this patent is extended or adjusted under 35 U.S.C. 154(b) by 166 days.

(21) Appl. No.: 17/865,120

(22) Filed: Jul. 14, 2022

(65) Prior Publication Data

US 2022/0346413 A1 Nov. 3, 2022

Related U.S. Application Data

(62) Division of application No. 16/463,307, filed as application No. PCT/US2017/063257 on Nov. 27, 2017, now Pat. No. 11,419,354.

(Continued)

(51) Int. Cl.
*H05B 6/64* (2006.01)
*A23K 10/37* (2016.01)
(Continued)

(52) U.S. Cl.
CPC ............... *A23L 5/34* (2016.08); *A23K 10/37* (2016.05); *H05B 6/6402* (2013.01); *H05B 6/645* (2013.01);
(Continued)

(58) Field of Classification Search
CPC ... A23K 10/37; A23L 5/30; A23L 5/34; B01F 23/804; B01F 23/81; H05B 6/6402;
(Continued)

(56) References Cited

U.S. PATENT DOCUMENTS

| 5,002,784 A | 3/1991 | Pare et al. |
| 5,458,897 A | 10/1995 | Pare |

(Continued)

FOREIGN PATENT DOCUMENTS

| CA | 2953836 A1 | 1/2016 |
| CN | 10216623 A | 8/2011 |
| WO | 2011127171 A1 | 10/2011 |

OTHER PUBLICATIONS

Mexico Institute for Intellectual Property Office Action for MX Patent Application No. MX/a/2019/006498 dated Apr. 19, 2023.

(Continued)

*Primary Examiner* — Quang T Van
(74) *Attorney, Agent, or Firm* — NK Patent Law (57) ABSTRACT

The presently disclosed subject matter is directed to a method of extracting bioactive agents from biomass using continuous microwave-assisted extraction. The disclosed method includes contacting the biomass with a solvent and optionally homogenizing the biomass. Then blending the biomass and the solvent and continuously passing the biomass though one more microwave assisted extraction units, thereby exposing the biomass to microwave energy. The solvent is separated from the biomass, where the separated solvent is the bioactive agent.

18 Claims, 10 Drawing Sheets

Related U.S. Application Data (60) Provisional application No. 62/430,086, filed on Dec. 5, 2016.

(51) Int. Cl.
*A23L 5/30* (2016.01)
*H05B 6/78* (2006.01)
*H05B 6/80* (2006.01)
*B01F 23/80* (2022.01)

(52) U.S. Cl.
CPC ............... *H05B 6/78* (2013.01); *H05B 6/80* (2013.01); *B01F 23/804* (2022.01); *B01F 23/81* (2022.01)

(58) Field of Classification Search
CPC .. H05B 6/645; H05B 6/78; H05B 6/80; Y02P 60/87
USPC ....... 219/682, 683, 687, 688, 689, 628, 679, 219/686, 710, 734, 735, 746, 748, 756, 219/772
See application file for complete search history.

(56) References Cited

U.S. PATENT DOCUMENTS

| | | |
|---|---|---|
| 5,599,137 A | 2/1997 | Stephenson |
| 8,084,038 B2 | 12/2011 | Kale |
| 8,173,941 B2 | 5/2012 | Lang et al. |
| 9,328,310 B1 | 5/2016 | Deng et al. |
| 11,419,354 B2 * | 8/2022 | Druga ..................... H05B 6/78 |
| 2013/0156655 A1 | 6/2013 | Van Thorre |
| 2016/0198750 A1 | 7/2016 | Carlson |
| 2017/0196244 A1 | 7/2017 | Simunovic |

OTHER PUBLICATIONS

IP Australia, Examination Report for corresponding Australian Patent Application No. 2017370525, mailed Jul. 5, 2021, 7 pages.

ISA/KR; International Preliminary Report on Patentability for International Patent Application No. PCT/US2017/063257 dated Feb. 19, 2018, 10 pages.

IPONZ; Office Action for New Zealand Patent Application No. 753798 dated May 21, 2020, 2 pages.

ISA/KR; International Search Report and Written Opinion for International Patent Application No. PCT/US2017/063257 dated Feb. 19, 2018, 17 pages.

CIPO; Office Action for Canadian Patent Application No. 3,045,447 dated Aug. 6, 2020, 6 pages.

USPTO; Non-Final Office Action for U.S. Appl. No. 16/463,307 dated Sep. 21, 2021, 6 pages.

USPTO; Final Office Action for U.S. Appl. No. 16/463,307 dated Jan. 28, 2022, 15 pages.

USPTO; Non-Final Office Action for U.S. Appl. No. 16/463,307 dated Mar. 29, 2022, 4 pages.

* cited by examiner

SYSTEM AND METHOD FOR CONTINUOUS MICROWAVE-ASSISTED EXTRACTION OF BIOACTIVE AGENTS FROM BIOMASS

CROSS-REFERENCE TO RELATED APPLICATIONS

This application is a divisional of U.S. Non-Provisional patent application Ser. No. 16/463,307, filed on May 22, 2019, which is a National Stage application of International Patent Application No. PCT/US17/63257, filed on 27 Nov. 2017, which claims the benefit of U.S. Provisional Patent Application Ser. No. 62/430,086, filed Dec. 5, 2016, the entire contents of which are all incorporated by reference herein.

TECHNICAL FIELD

The presently disclosed subject matter is generally directed to a method for continuous microwave-assisted extraction of bioactive agents from biomass.

BACKGROUND

There is a high incidence, abundance, and variety of bioactive agents occurring in nature, particularly in materials of plant origin (i.e., biomass). The bioactive agents are frequently found in fruits and vegetables, including the less utilized or discarded parts, such as skins, peels, and seeds. In many cases, it is difficult to get the desirable effects of bioactive substances via direct consumption of fruits and vegetables due to their low overall concentration and the functional ballast of additional accompanying ingredients. Continuous flow microwave processing and subcritical water processing are emerging technologies that have potential in extraction applications, especially those focused on isolation of bioactive agents in plant materials. However, the implementation of continuous flow microwave technology and subcritical water technology has been constrained due to limited experience, inappropriate design, and narrow operational capabilities of currently available microwave equipment. It would therefore be beneficial to provide a system and method that would bring the inherent benefits of continuous flow microwave processing technologies and/or subcritical water technologies to applications such as the extraction of bioactive ingredients from plant materials.

SUMMARY

In some embodiments, the presently disclosed subject matter is directed to a method of extracting one or more bioactive agents from biomass. Particularly, the method comprises contacting the biomass with a solvent, optionally homogenizing the biomass, blending the biomass and the solvent, continuously passing the biomass though one more microwave assisted extraction units, thereby exposing the biomass to microwave energy, and separating the solvent from the biomass wherein the separated solvent comprises the bioactive agent. In some embodiments, the separating comprises gravity filtration, vacuum filtration, syringe filtration, passing through a resin, or combinations thereof. In some embodiments, the method further comprises separating the one or more bioactive agents from the solvent. In some embodiments, the method further comprises concentrating the one or more bioactive agents.

In some embodiments, the solvent is selected from water, acetic acid, innate liquid, ethanol, or combinations thereof.

In some embodiments, the ratio of solvent to biomass is about 1:10, 1:5, 1:4, 1:3, 1:2, or 1:1.

In some embodiments, the one or more bioactive agents are selected from one or more carotenoids, polyphenols, vitamins, flavonoids, isoflavones, curcuminoids, ceramides, proanthocyanidins, terpenoids, sterols, phytosterols, sterol esters, tocotrienols, squalenes, or retinoids.

In some embodiments, the biomass comprises agricultural crop wastes, crop residues, or combinations thereof.

In some embodiments, one or more additives are added to the biomass before, after, or both before and after passing the biomass though a microwave assisted extraction module. In some embodiments, the one or more additives are selected from acids, bases, salts, buffering systems, chelating agents, antioxidants, antimicrobial agents, or combinations thereof.

DETAILED DESCRIPTION

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "an additive" can include a plurality of such additives, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments +/−0.1%, from the specified amount, as such variations are appropriate in the disclosed packages and methods.

The presently disclosed subject matter is directed to a system and method of extracting bioactive materials from biomass using continuous flow microwave assisted extraction. The term "biomass" as used herein broadly refers to any plant-based material, such as fruit and vegetables. Thus, biomass includes (but is not limited to) plant leaves, stems, roots, flowers, seeds, seed pods, whole plants, saps, barks, and the like. In some embodiments, biomass can include agricultural crop wastes and residues, such as blueberry skins, blueberry leaves, cranberry leaves, green tea leaves, grape seeds, sweet potato peels, and the like. The term "bioactive agent" as used herein refers to a substance that has a beneficial effect on the health of a human or animal. For example, suitable bioactive agents can include (but are not limited to) carotenoids, polyphenols, vitamins, flavonoids, isoflavones, curcuminoids, ceramides, proanthocyanidins, terpenoids, sterols, phytosterols, sterol esters, tocotrienols, squalenes, and/or retinoids. It should be appreciated that there can be additional components extracted in addition to the bioactives, such as flavor compounds. The term "microwave assisted extraction" as used herein refers to the process of heating a biomass slurry (biomass and solvent) using microwave energy to partition compounds of interest (i.e., bioactive agents) from the biomass into the solvent. "Continuous microwave assisted extraction" refers to a microwave assisted extraction method where solvent and biomass are pumped continuously though the microwave system to extract bioactive agent(s).

Figure 1:
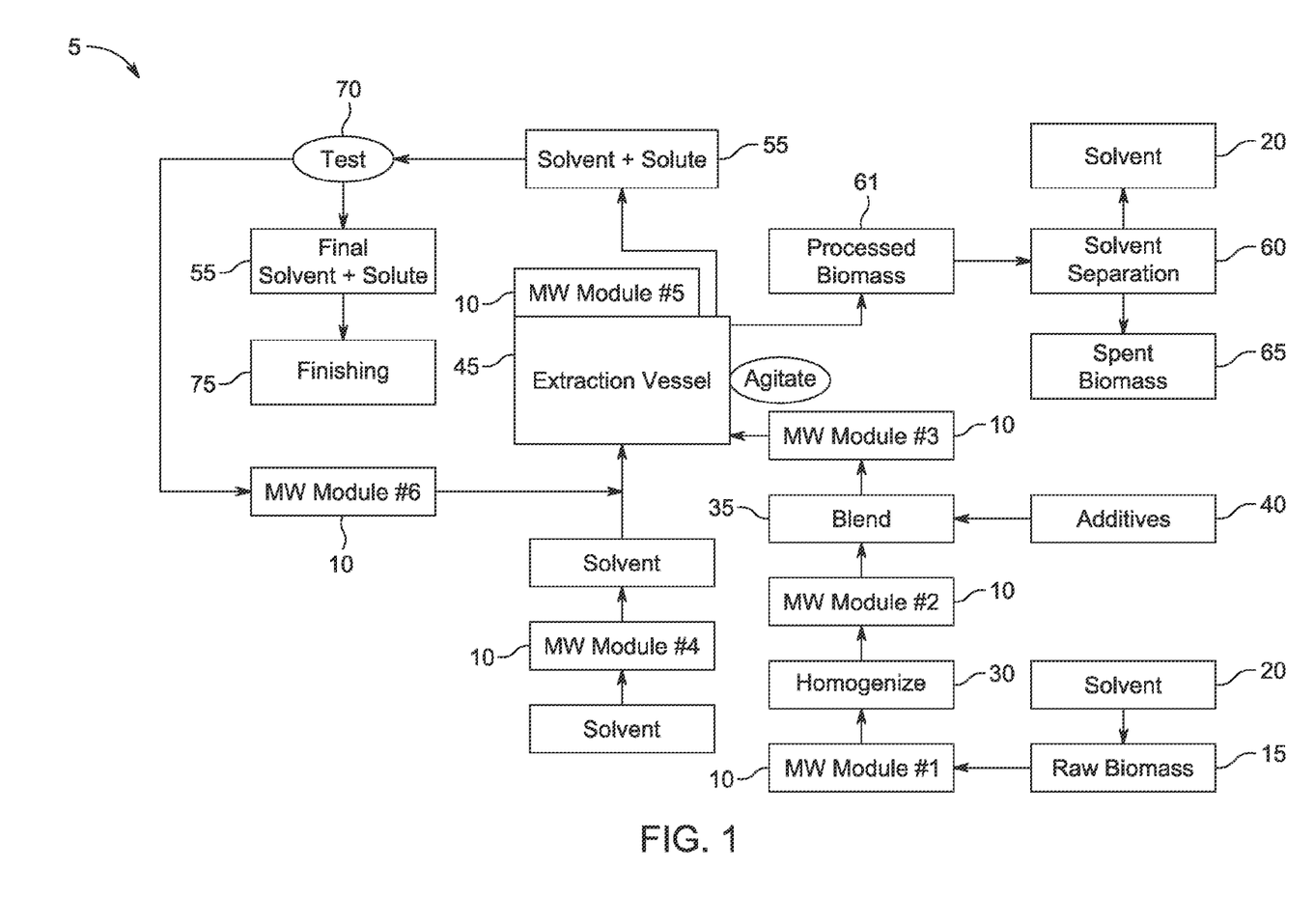
FIG. 1 is a schematic representation of a microwave assisted extraction system in accordance with some embodiments of the presently disclosed subject matter.

As illustrated in FIG. 1, system 5 comprises a plurality of microwave processing units 10. The disclosed processing units are constructed from rigid microwave-transparent materials, such as glass, ceramic materials, and/or thermoplastic polymers (i.e., TEFLON®, polyetherimide, polymethylpentene, polyetheretherketone, and the like). The microwave modules are designed to expose biomass, solvent, biomass slurry (biomass and solvent), and/or solvent/bioactive agent mixtures to electromagnetic radiation at various stages of the disclosed microwave assisted extraction process.

Microwave units 10 are configured as consecutive or spatially displaced flow-through microwave application units. Each unit individually provides substantially non-uniform electromagnetic field exposure, but cumulatively results in a relatively uniform field exposure via multiple passes through the same and/or consecutive application chambers. In some embodiments, the proposed continuous flow microwave treatment can be implemented at several different processing stages. For example, as illustrated in FIG. 1, the disclosed system can comprise multiple microwave units 10. Each unit can comprise a single flow-through microwave treatment device or multiple combinations of identical or different continuous flow microwave treatment devices (applicator geometries), such as cylindrical, focused energy, multi-mode, traveling wave, and/or modular designs. In use, biomass is pumped through each application unit within a microwave-transparent tube for a predetermined exposure period. In some embodiments, each microwave unit 10 can be driven by a single or multiple frequency microwave energy generator (i.e., 915 MHz or 2450 MHz frequencies, for example). In some embodiments, combined successive frequency treatments can be preferred to single frequency treatments. In each case, the biomass is always continuously flowing through the application for precise controlled exposure.

The disclosed system can incorporate any combination of industrial microwave frequencies and any combination of microwave applicator geometries. For example, microwave units 10 can comprise a single applicator type, single frequency, single process location, or can comprise any combination of multiples of identical or different applicators delivering identical or different microwave frequency treatments at a single location or multiple locations, as shown in FIG. 1.

In some embodiments, biomass slurry is continuously processed in-line with the microwave energy such that the energy is only applied to the combination of solvent and biomass (e.g., the biomass slurry). Further, while passing through some or all microwave units 10, the biomass slurry can be subjected to subcritical water extraction. The term "subcritical water" refers to water that is heated under increased pressure, but below its critical point so that the water remains a liquid. Thus, the disclosed continuously flowing system can be held under a targeted pressure to allow water to reach temperatures above its atmospheric boiling point. When water is in the subcritical state, its polarity changes and thus can mimic the polarity of different chemical solvents. The polarity shift can be controlled through manipulation of temperature and pressure in a predictable and well-documented manner. For example, typical ranges can include pressures of about 50-300 psi (e.g., 75-270, 100-250, or 125-200 psi) and temperatures of about 120-190° C. (e.g., 125-180, 140-175, or 145-160° C.). However, the presently disclosed subject matter is not limited and can include pressures and temperatures above or below the cited ranges. For example, pressures can range from at least about (or no more than about) 50, 60, 70, 80, 90, 100, 110, 120, 130, 140, 150, 160, 170, 180, 190, 200, 210, 220, 230, 240, 250, 260, 270, 280, 290, or 300 psi. Suitable temperatures can range from at least about (or no more than about) 120, 125, 130, 135, 140, 145, 150, 155, 160, 165, 170, 175, 180, 185, or 190° C. Further see, for example, Alghoul et al., Characterization of the Polarity of Subcritical Water, J Chromatography A, 1486 (2017) 42-47, the entire content of which is hereby incorporated by reference herein.

Figure 2:
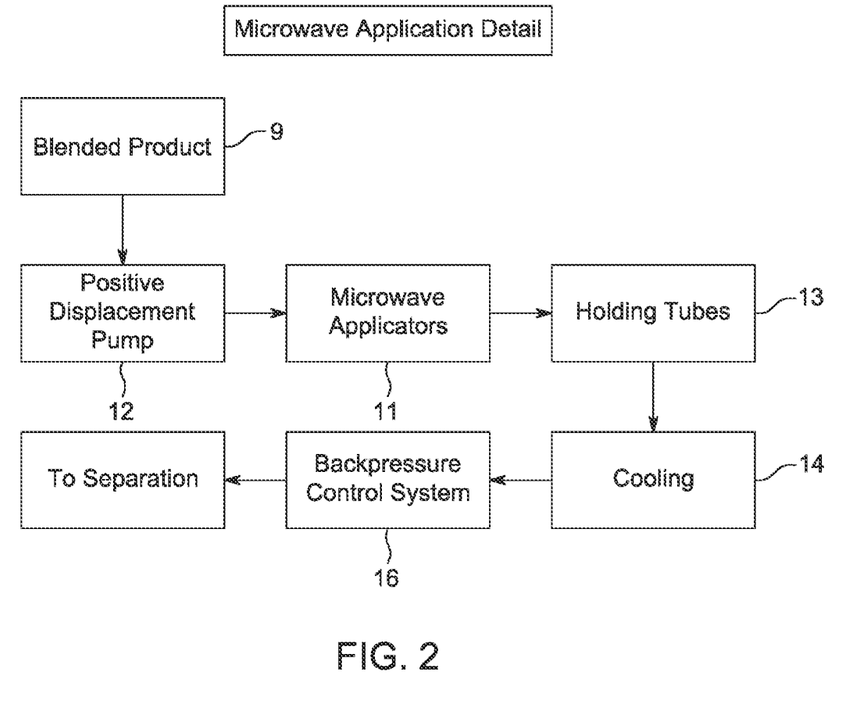
FIG. 2 is a schematic representation of a subcritical water microwave assisted extraction unit in accordance with some embodiments of the presently disclosed subject matter.

FIG. 2 illustrates one embodiment of a system comprising subcritical water microwave assisted extraction unit 11. Particularly, blended/mixed biomass slurry can be pumped through the system using pump device 12. The pump device can include any of the wide variety of pump devices known or used in the art, including (but not limited to) a positive displacement pump, diaphragm pump, membrane pump, reciprocating pump, gerotor pump, internal gear pump, external gear pump, triple screw pump, axial piston pump, rotary vane pump, radial piston pump, and/or centrifugal pump. Pump device 12 can be selected to offer positive displacement and to ensure capability of handling the viscosity and pressure of the system. The biomass slurry is pumped through subcritical water microwave assisted extraction unit 11, and into holding tubes 13. Holding tubes 13 function to hold the product at a given temperature for a predetermined period of time to allow the extraction to take place without the application of additional energy. The extracted biomass slurry is then cooled at cooling unit 14 for a desired period of time to allow the biomass slurry to reach a desired temperature. Cooling unit 14 can include any cooling device known or used in the art, such as (but not limited to) refrigeration units, freezer units, and the like. The disclosed system can further include backpressure control unit 16 to apply a specific controlled pressure (such as about 200 psi) in the microwave system for a fixed period of time. The disclosed system maintains an elevated and precise pressure and temperature over a particular period of time. In some embodiments, the temperature will be greater than about 100° C. to ensure favorable subcritical water conditions. Compared to ambient water, subcritical water is significantly different in its dielectric constant, thermal conductivity, ion product, viscosity, and density. As a result, subcritical water can efficiently solubilize many of the bioactive agents in biomass.

Advantageously, use of the subcritical water microwave assisted extraction unit allows the user to use the polarity of water in the subcritical range in lieu of solvents. In addition, use of subcritical water enables faster exposure times (e.g., a few seconds versus several hours in some embodiments. For example, in some embodiments, the exposure time can include times of about 10 seconds-10 minutes, such as 30 seconds-9 minutes, 45 seconds-8 minutes, 1-7 minutes, 2-6 minutes, or 3-5 minutes. Thus, the exposure time can be at least (or no more than) 10, 15, 20, 25, 30, 35, 40, 45, 50, or 55 seconds, 1 minute, 2 minutes, 3 minutes, 4 minutes, 5 minutes, 6 minutes, 7 minutes, 8 minutes, 9 minutes, or 10 minutes. However, the exposure time is not limited and can include fewer or greater times than the ranges given above.

In some embodiments, system 5 can comprise one or more homogenization units 30 to reduce the size of the biomass before and/or after passing through one or more extraction units to ensure flowability. The term "homogenize" as used herein refers to the process of physically breaking down biomass into a smaller and/or more uniform size. As a result, the homogenized biomass is sufficiently free-flowing for further processing and/or extraction. In addition, the smaller sized biomass particles maximize exposure to the liquid solvent and flow homogeneously with the solvent after microwave exposure. Homogenization unit 30 can comprise any homogenizing device capable of cutting, milling, pressing, grinding, shearing, and/or chopping biomass. For example, in some embodiments, the homogenization unit can comprise one or more silage choppers, colloid mills, processors (such as an Urschel Comitrol® processor, available from Urschel Laboratories, Chesterton, Indiana), forage harvesters, hammer mills, knife choppers, and the like. However, it should be appreciated that homogenization unit 30 is optional and the disclosed system can include embodiments without a homogenization unit.

In some embodiments, the disclosed system can comprise at least one blending unit 35 where solvent 20 and/or additives 40 can be added to the biomass. The blending unit ensures uniform mixing of the biomass, solvent, and/or additives to create a homogenous mixture. The term "additive" as used herein refers to a substance that is added to biomass or solvent to affect its characteristics. In some embodiments, suitable additives can include (but are not limited to) acids, bases, salts, buffering systems, chelating agents, antioxidants, antimicrobial agents, and the like. Any of the wide variety of devices capable of mixing can be used in blending unit 35, such as (but not limited to) blenders, mixers, and the like. It should be appreciated that blending unit 35 is optional and the disclosed system can include embodiments without a blending unit.

System 5 comprises one or more extraction vessels 45 used to extract solvent comprising bioactive agent from processed biomass slurry 25. For example, extraction vessel 45 can be configured as a basket filter or screen wherein the biomass is held static while the solvent and bioactive agent mixture continuously flows through the biomass. In some embodiments, extraction vessel 45 can include an agitation element. After a desired period of time, processed biomass 50 is discharged and vessel 45 is refilled with fresh biomass. In some embodiments, the extraction vessel can comprise one or more microwave extraction units 10 for microwave treatment during extraction. For example, the microwave extraction unit can be a microwave kettle-type device.

The disclosed system can include one or more separation units 60 where processed biomass 61 (i.e., biomass exiting the extraction vessel) can be subjected to further removal of solvent. Any known device or method that can be used to separate biomass and solvent can be used, such as a rinsing step, screw press, and/or centrifuge (depending on particle size). For example, in some embodiments, separation unit 60 can include a basket screen that holds biomass and allows solvent to flow through. In some embodiments, the separation unit can include a decanter separator for polyphenols and a centrifugal separator for oils. After solvent 20 has been removed, spent biomass 65 can be disposed of or recycled. It should be appreciated that separation unit 60 is optional and is not included in some embodiments of the disclosed system.

In some embodiments, the disclosed system comprises one or more testing units 70 where bioactive agent/solvent mixture 55 exiting the extraction vessel can be tested. The testing unit comprises any of the wide variety of instrumentation devices known or used in the art. Such instrumentation includes (but is not limited to) devices useful for measuring and/or calculating concentration, pH, temperature, and the like. For example, in some embodiments, the concentration of polyphenols and/or anthocyanins in the solute can be measured. In this way, the user can determine whether an additional pass through extraction vessel 45 is needed. For example, if the concentration of a desired bioactive agent is low, bioactive agent/solvent mixture 55 can be extracted multiple times to extract all or substantially all of the bioactive agent from the mixture. Testing unit 70 is particularly useful for embodiments where the biomass is held steady and the solvent passes through it while the biomass is under microwave energy exposure. It should be appreciated that testing unit 70 is optional.

System 5 can comprise one or more finishing units 75 to reduce the bioactive agent to a desired state. Particularly, once solvent/bioactive agent mixture 55 is within desired parameters, the mixture can pass through one or more finishing units. In some embodiments, the finishing unit can include one or more evaporators to remove or reduce solvent and/or water content as desired by the user to provide a more concentrated yield of bioactive agent. Any commercially available evaporator can be used. Alternatively, or in addition, the finishing unit can include a dryer to convert the bioactive agent to a solid (powder) from a liquid form. The presently disclosed subject matter is not limited, and any conventional dryer can be used. Further, finishing unit 75 is optional.

System 5 further comprises a pumping structure to move biomass between microwave assisted extraction units, homogenizing units, blending units, and the like. In some embodiments, the pumping system comprises a conveyor and/or tubing. For example, in some embodiments biomass slurry, solvent/bioactive agents, or solvent travels to successive microwave processing units 10 through the use of tubing. Any of the wide variety of tubing known or used in the art can be used.

In use, system 5 is used to extract bioactive agents from biomass. Particularly, as shown in FIG. 1, raw biomass 15 enters the system through any standard transport vehicle, such as (but not limited to) a conveyor. Solvent 20 is added to raw biomass 20 to form a homogeneous mixture or slurry. In some embodiments, the biomass can be processed prior to or after mixing with solvent by chopping, grinding, etc. in homogenization unit 30 to reduce the size of the biomass particles. The biomass slurry can also be processed in blending unit 35 to ensure uniform mixing of biomass, additives, and/or solvent. The biomass slurry then continuously passes though one more microwave units 10. Particularly, as the slurry passes through the microwave units, microwave energy is absorbed by the biomass, leading to a positive differential in temperature between the biomass and the solvent, ensuring that the bioactive agent migrates toward the solvent. Further, the application of microwave energy results in a sudden rise in temperature, thereby rupturing the cells of the biomass. The bioactive agents housed in the cells are then free to flow out of the cells and migrate to the solvent. The biomass can be exposed to microwave energy for a desired amount of time, such as a period of time sufficient to extract all or substantially all of the bioactive materials from the biomass. The term "substantially all" refers to an amount of at least about 70 weight percent, such as at least about (or no more than about) 70, 75, 80, 85, 90, 91, 92, 93, 94, 95, 96, 97, 98, 99, or 99.9 weight percent. In some embodiments, the biomass is exposed to the electromagnetic field for about 1-200 seconds. However, it should be appreciated that the exposure time can vary depending on the particular variety of biomass, solvent used, moisture content of the biomass, and the like. Further, the overall microwave power or dose to be applied can be selected and varied depending on the particular biomass and/or solvent used.

After passing through at least one microwave unit 10, the biomass slurry travels to extraction vessel 45 where the solvent and bioactive agent mixture 55 is separated from processed biomass 50. The processed biomass can optionally travel to a separator to isolate solvent 20 from the spent biomass for disposal or reuse in system 5. Mixture 55 can pass through testing unit 70 prior to finishing unit 75 where the bioactive agent is converted to a desirable form (e.g., concentrated, converted to a powder, etc.). Alternatively, in some embodiments, the bioactive agent can be separated from the solvent. Spent solvent can be disposed of or reused in the disclosed system, and bioactive agent can be concentrated or dried using any method known in the art, such as evaporation.

Figure 3:
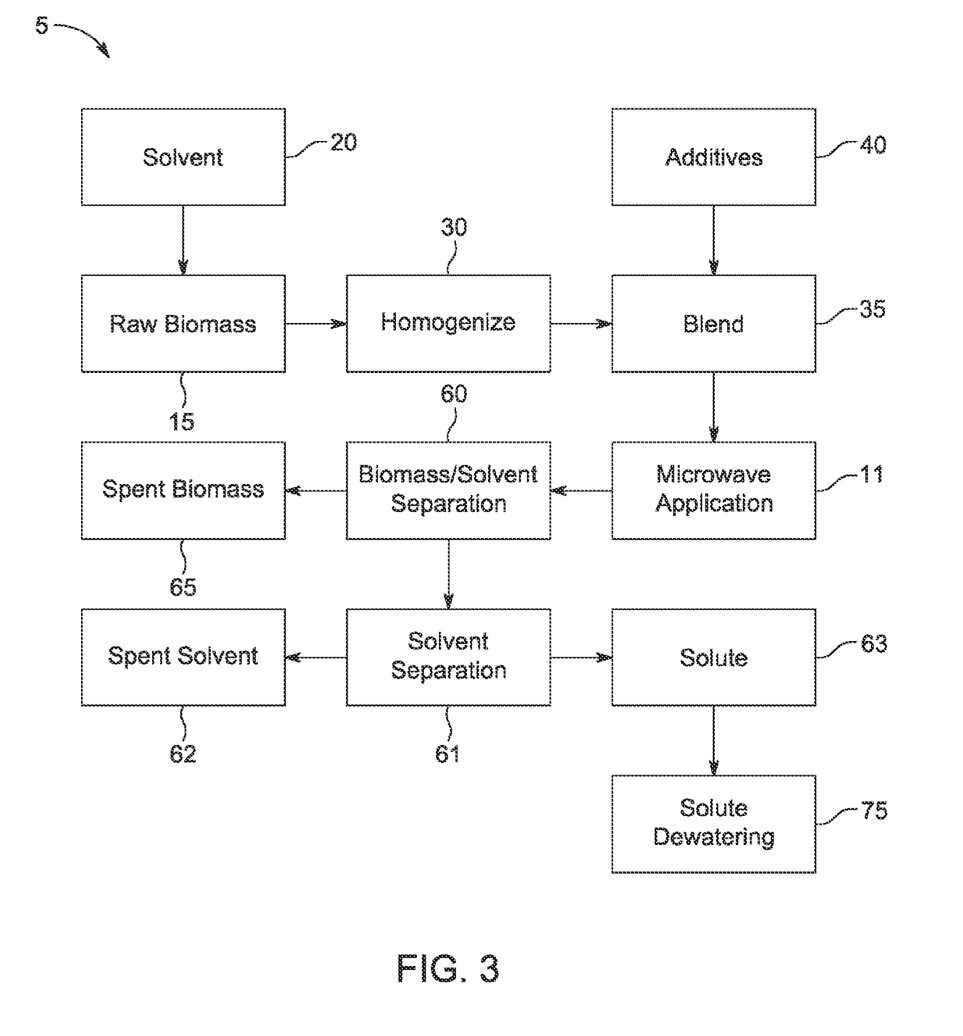
FIG. 3 is a schematic representation of a subcritical water microwave assisted extraction system in accordance with some embodiments of the presently disclosed subject matter

FIG. 3 illustrates one embodiment of system 5 comprising subcritical water microwave assisted extraction unit 11. Particularly, in use solvent 20 is added to raw biomass 15 to create a slurry. The slurry can then pass through homogenization unit 30 and/or blending unit 35 to ensure the biomass slurry is of an acceptable size and is properly mixed. The slurry passes through subcritical water microwave assisted extraction unit 11 where the slurry is subjected to subcritical water temperature and pressure conditions (e.g., temperature of at least 100° C. and pressure of at least 150 psi) for a desired amount of time. The slurry is then pumped through separation unit 60 where spent biomass 65 is separated from solvent and bioactive agent. In some embodiments, the bioactive agent can be separated from the solvent at solvent separation unit 61. In some embodiments, the separating unit comprises gravity filtration, vacuum filtration, syringe filtration, passing through a resin, or combinations thereof. Spent solvent 62 can be disposed of or reused in the disclosed system. Bioactive agent 63 can be concentrated or dried using any method known in the art, such as evaporation or drying at finishing unit 75.

In some embodiments, the pumping structure of system 5 can include at least one area that provides counter-current movement of solvent relative to the movement of the treated biomass. Particularly, the counter-current movement can be achieved using a system of traveling chambers comprising a chain-link loop and separator paddles. Thus, the chain conveyer and paddles can be used to load and convey segmented chambers filled with equal quantities of biomass through a system of conduits. Microwave-transparent conduits, chains, and gravity-controlled two-way ball valves enable the transport of biomass to be subjected to extraction through a system of controllable microwave application devices. The mass throughput of the processed biomass can be controlled through adjusting the speed of the chain conveyer drive. In addition, the related throughput of the solvent and the resulting solvent/bioactive agent stream can be controlled via the pump flow rate control. In some embodiments, each reusable component within the disclosed conveyance system (i.e., the chain segments, separator paddles, valve spheres, sphere frames, etc.) can be fabricated from microwave-transparent glass, ceramic, and/or polymeric materials to enable the passage of the extraction modules through a microwave processing environment. It has been surprisingly found that the disclosed system that enables counter-current material flow results in more beneficial extraction applications.

The disclosed counter-current extraction system is based on the formation of selectively permeable moving extraction modules (chambers) carrying processed biomass traveling in one direction (i.e., downward in some embodiments) and the bioactive agent traveling in the opposite direction (i.e., upward in some embodiments). The combination of opposite flow directions and the passing of solvent through consecutive moving chambers filled with biomass enables an incremental rise in the bioactive concentration within the solvent as it moves through the sequence of chambers. In addition, the bioactive agent is incrementally diluted and removed from the biomass as it is subjected to the multiple washing by the solvent. All ingredients are optionally and selectively exposed to the microwave field exposure using the sequence of individually controllable microwave exposure chambers/applicator devices. In some embodiments, the final concentration of bioactive agent is maximized in the outgoing solvent/solute stream and minimized in the spent biomass stream.

Figure 4:
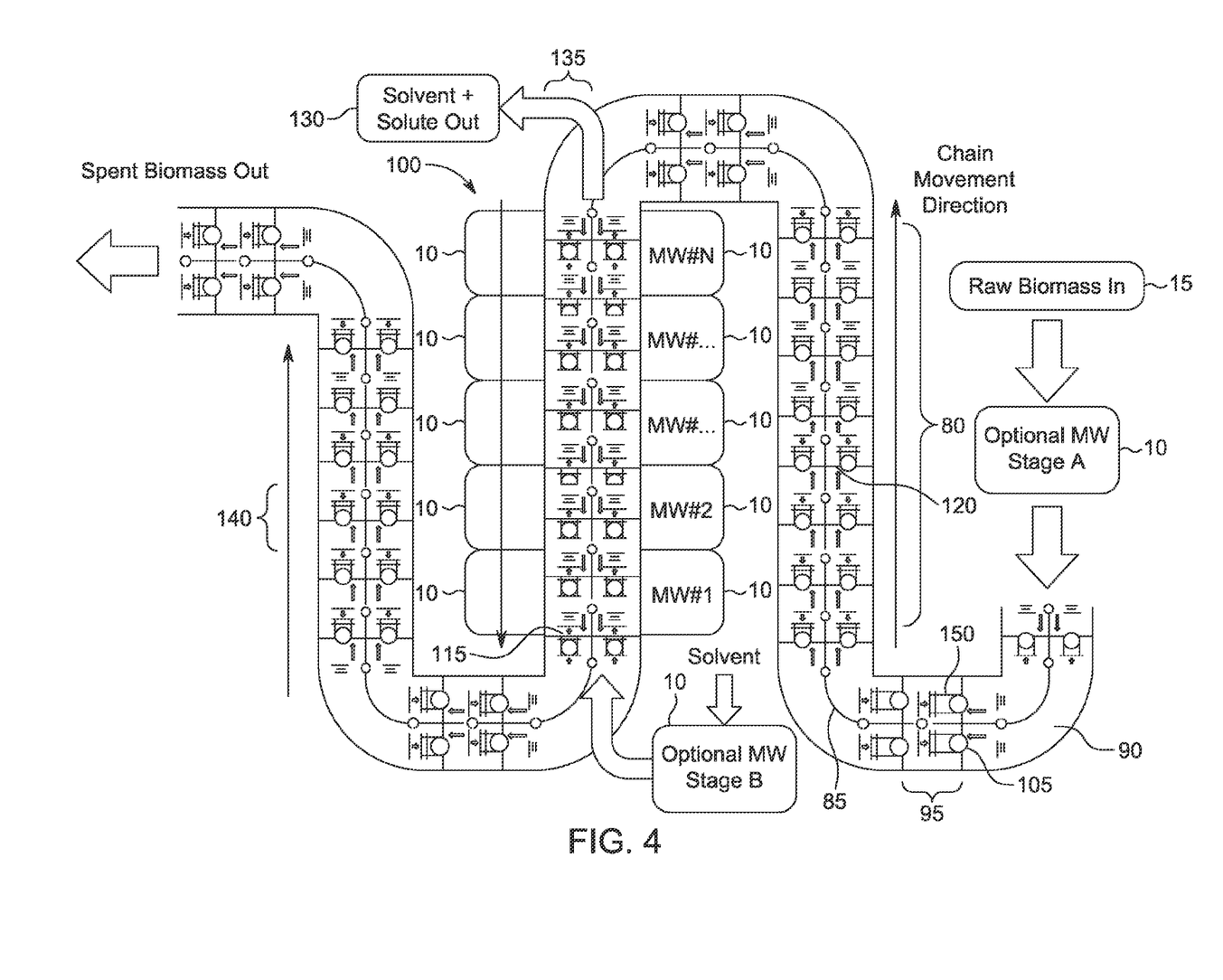
FIG. 4 is a schematic representation of a microwave assisted extraction system with countercurrent flow in accordance with some embodiments of the presently disclosed subject matter.

As set forth in FIG. 4, in some embodiments the disclosed system and method comprises introducing raw biomass 15 into the system. In some embodiments, biomass 15 can be diluted with solvent 20 to initiate the starting stage of extraction via blending and/or mechanical handling during the initial conveyance stage. In some embodiments, the single or multiple-component biomass can be exposed to initial treatment in microwave module 10 before entering the conveyance system.

During the passage of biomass through first leg 80 of the system, chain 85 is moving in an upward direction within conduit 90. A gravity-driven system of ball valves prevents (to the extent possible and feasible) flow-through of solvent through chambers 95. As the material enters second leg 100 with the downward movement of the carrier chain conveyer, valve balls 105 are inverted within ball cages 150, thereby opening perforations 115 in paddles 120 and allowing the upwardly flowing solvent to pass incrementally through consecutive chambers formed by neighboring circular paddles. As a result, consecutive segmented extraction and solute concentration maximization is achieved in the solvent/bioactive stream. The paddles conform substantially to the cross-sectional geometry of the reaction vessel for moving biomass along the vessel and out of the vessel. It should be appreciated that other handle designs known and used in the art can be incorporated.

In some embodiments, solvent 20 can be introduced into the system using a pump to enter at lower portion 125 of the vertical microwave transparent conduit (i.e., the lower portion of second leg 100). Flow rate control of the solvent can be achieved via the control of the pump rotation. In some embodiments, the solvent and bioactive agent mixture exits the system through a discharge element 130 (such as, for example, a filtered gate) at top portion 135 of second leg 100. It should be appreciated that mass flow of biomass, flow rate of the solvent/bioactive stream, and microwave energy exposure via power level and spatial density can all be individually controlled to optimize the final concentration of bioactive agent in the stream and/or to optimize the cost and economics of producing a unit extracted bioactive agent. Extracted biomass can be removed from system 5 through third leg 140 of conveyance with the downward motion of the chain conveyer.

In some embodiments, the disclosed system utilizes a network of high or low density spherical plugs/opening controls to prevent passage of solvent 20 from chamber to chamber in selected segments of the system. The plugs also allow the passage of solvent through the consecutive chambers in other segments where a more active extraction is performed (such as microwave assisted extraction).

Figure 5A:
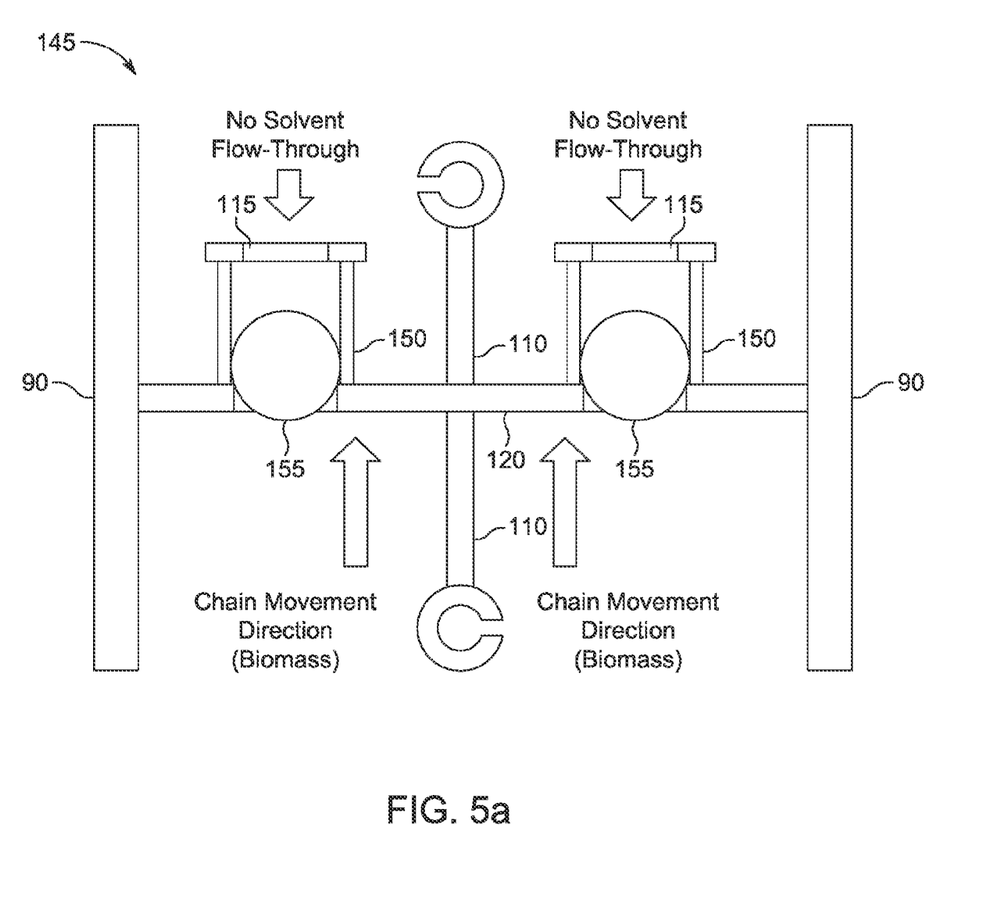
FIGS. 5a and 5b are sectional views of one embodiment of the disclosed chain conveyor system equipped with high density spheres.

FIG. 5a illustrates one embodiment of chain conveyor 145 comprising chain 110, paddle 120 equipped with two sphere cages 150 and two encased and movable high density spheres 155 where the chain and biomass are traveling in a vertical, upwardly moving direction. Spheres 155 can be constructed from any high density microwave transparent material known or used in the art, such as TEFLON®, polyetherimide, polymethylpentene, polyetheretherketone, and the like. Solvent flow is minimized between neighboring chambers formed by the cylindrical spaces between each pair of neighboring circular paddles. Chain conveyer 145 moves within a cylindrical conduit, which in some embodiments can be formed from a microwave transparent polymer material. Solvent flows in a counter-current (downward) direction relative to the upward movement of biomass carried by the chain conveyer.

Figure 5B:
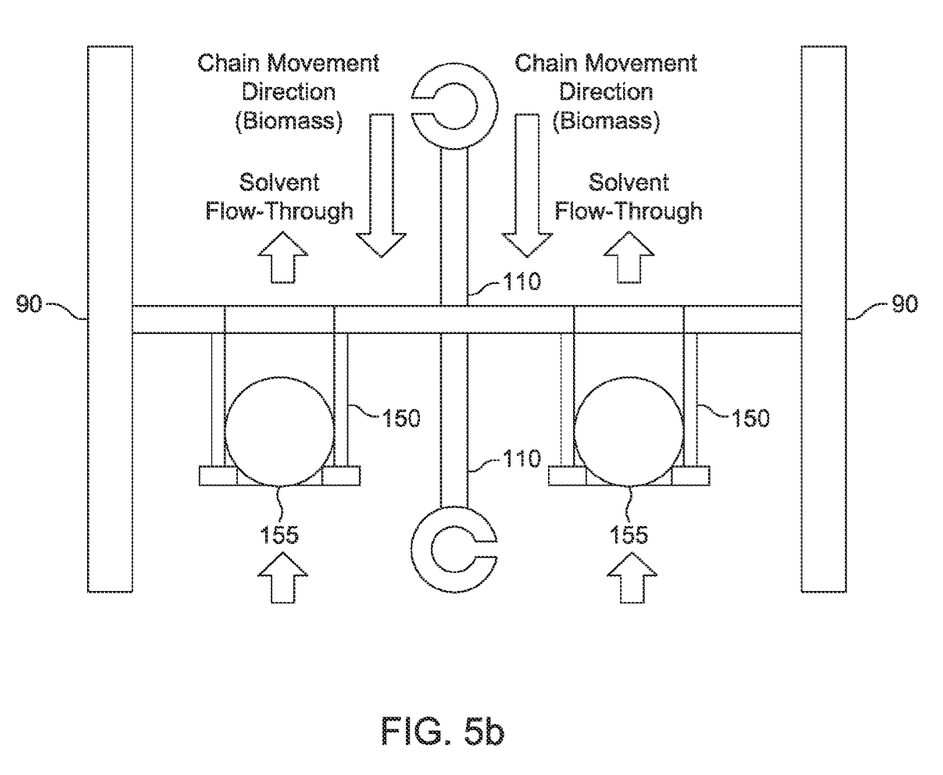

FIG. 5b illustrates the chain conveyor of FIG. 5a equipped with movable high density spheres 155 where the chain and biomass are traveling in a vertical, downward moving direction. Spheres 155 enable the solvent flow-through between neighboring chambers formed by the cylindrical spaces between each pair of neighboring circular paddles 120. Solvent flows in a counter-current (upward) direction relative to the downward movement of biomass carried by the chain conveyer.

Figure 6A:
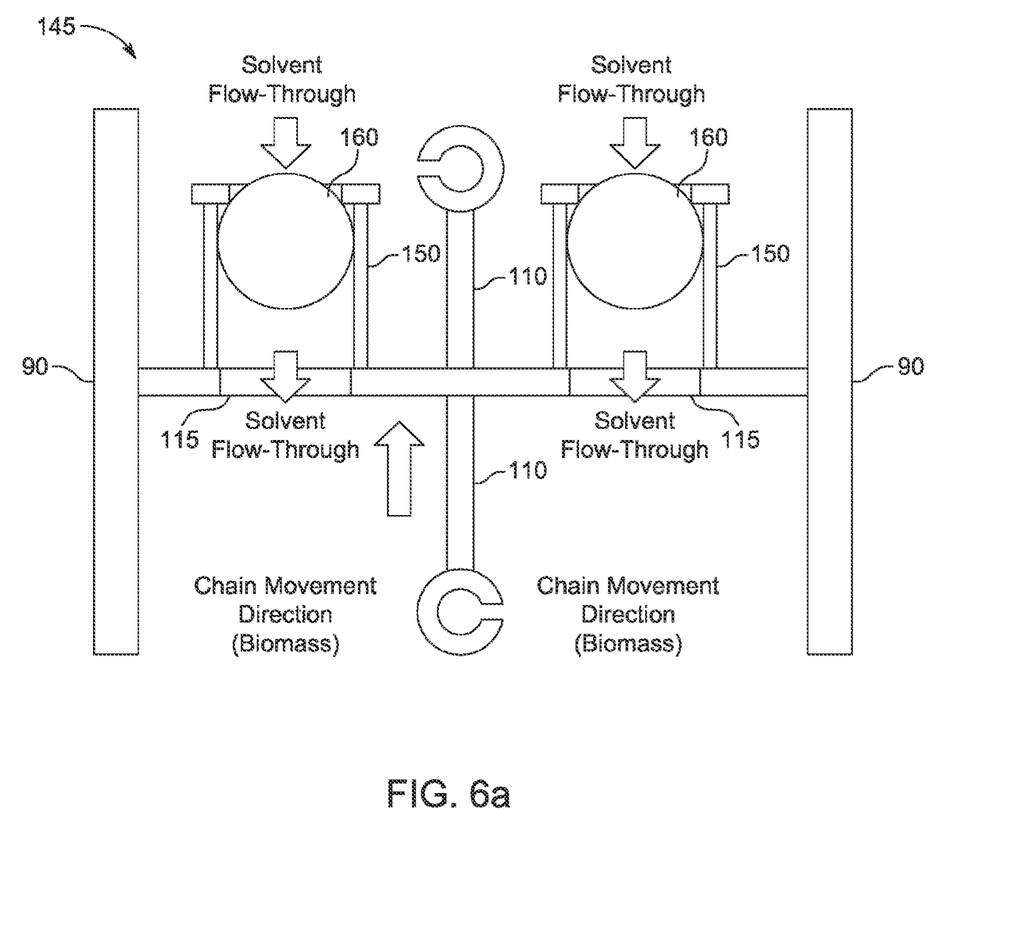
FIGS. 6a and 6b are sectional views of one embodiment of the disclosed chain conveyor system equipped with low density spheres.
Figure 6B:
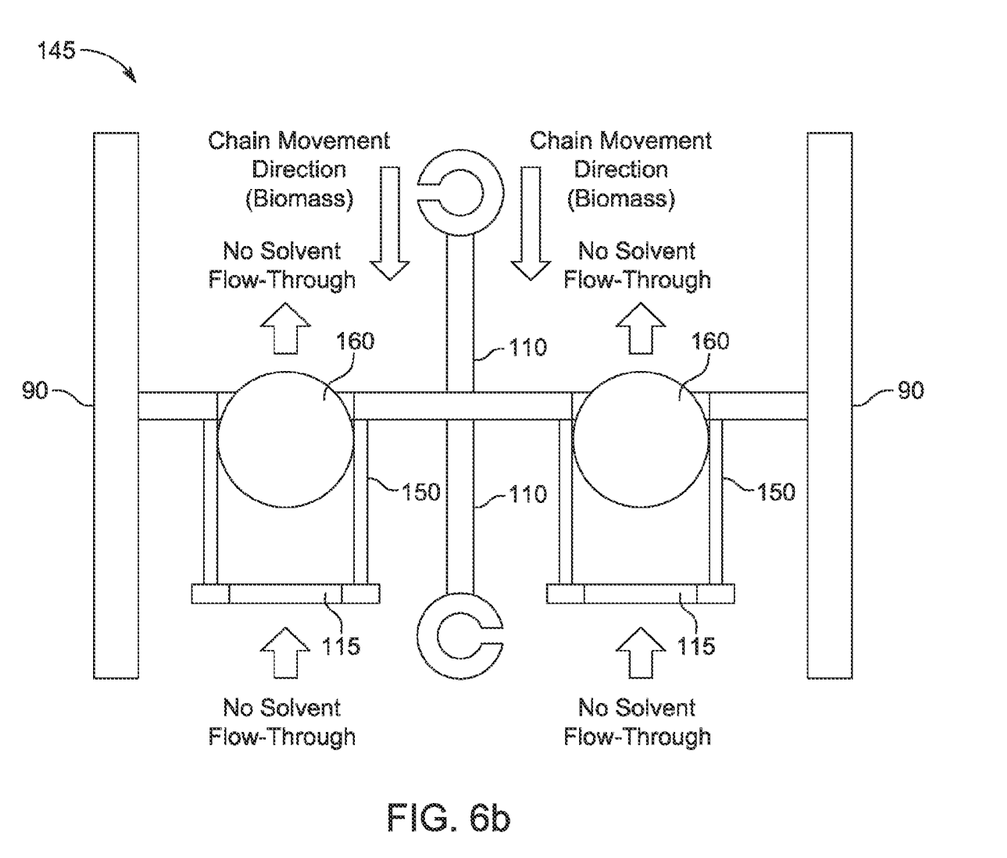
Figure 7A:
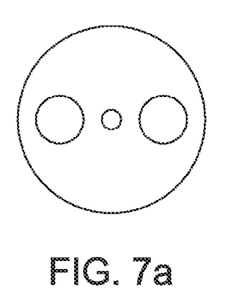
FIGS. 7a-7f illustrate the distribution of openings on consecutive conveyor paddles in accordance with some embodiments of the presently disclosed subject matter.
Figure 7B:
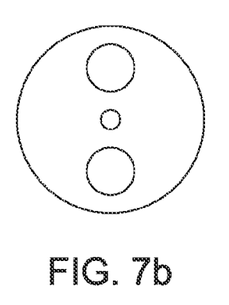
Figure 7C:
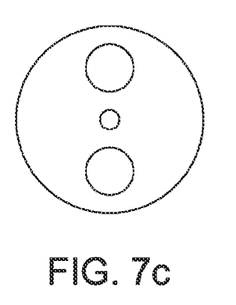
Figure 7D:
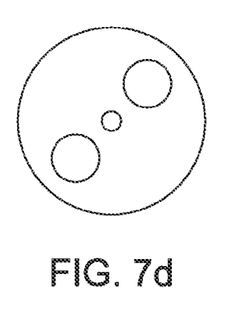
Figure 7E:
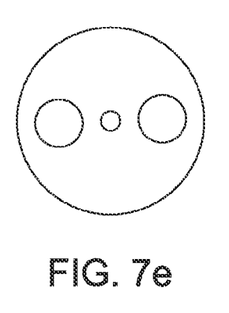
Figure 7F:
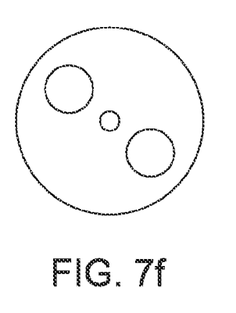

In some embodiments, chain conveyor 145 can comprise movable low density (buoyant) spheres 160 housed in cages 150, as shown in FIG. 6a. Low density spheres 160 can be constructed from any low density microwave transparent material known or used in the art, including (but not limited to) polymethylpentene (TPX®), polypropylene, and the like. In some embodiments, low density spheres 160 can be configured as hollow spheres constructed from higher density materials. The low density spheres allow solvent to flow through neighboring chambers formed by the cylindrical spaces between each pair of neighboring circular paddles 120. Thus, the chain conveyer moves within a cylindrical conduit, and the solvent flow is in a counter-current (downward) direction relative to the upward movement of biomass carried by the chain conveyer. FIG. 6b illustrates a single circular paddle of chain conveyer 145 equipped with movable low density spheres 160 in a vertical, downwardly moving direction. Low density spheres 160 allow solvent 20 to flow through neighboring chambers formed by the cylindrical spaces between each pair of neighboring circular paddles.

FIGS. 7a-7f illustrate a representative distribution of openings 165 on consecutive circular conveyer paddles 120 to optimize the exposure and/or wash-through of the biomass with the counter-current flowing solvent. Particularly, FIGS. 7a and 7b alternate between two opening orientations. The distribution of openings illustrated in FIGS. 7c-7f alternates between four orientations. It should be understood that each opening distribution will be appropriate for a different type of biomass and/or solvent system. The intended objective of the alternating opening orientations is to create more turbulent, active mixing via implementation of the solvent flow through the biomass. As a result, a higher degree of extraction treatment uniformity and a higher final solute concentration overall can be achieved.

Advantageously, the disclosed system and method exhibit a greater than 90% reduction in total process time. In addition, improved nutrient retention for thermally sensitive compounds (such as polyphenols) has been shown. Further, a target of greater than 90% recovery of bioactive agent has been shown in a single pass through the disclosed system.

The presently disclosed continuous extraction system and method have broad and flexible applications in the extraction of soluble bioactive agents from plant biomaterials (such as underutilized or discarded byproducts of food) and biomaterials processing. As a result, the overall value of production is increased. Advantageously, the disclosed extraction system accelerates, improves, and optimizes the extraction process. For example, extraction times can be reduced to minutes instead of the typical 4-8 hour time frame. In addition, the system allows precise exposure to microwave energy to rupture cell walls. In addition, the disclosed system and method offer improved yields and reduced costs of operation. For instance, the disclosed method uses fewer or no chemicals to reduce costs of operation, such as through the use of subcritical water to reduce the need for chemical solvents. Further, the disclosed system provides an industrial grade and throughput microwave assisted extraction system that is scalable and expandable using additional pass through stages and multiple microwave field exposures.

EXAMPLES

The following Example has been included to provide guidance to one of ordinary skill in the art for practicing representative embodiments of the presently disclosed subject matter. In light of the present disclosure and the general level of skill in the art, those of skill can appreciate that the following Example is intended to be exemplary only and that numerous changes, modifications, and alterations can be employed without departing from the scope of the presently disclosed subject matter.

Example 1

Microwave Assisted Extraction of Bioactives

About 36 pounds of blueberry pomace biomass was mixed with about 11 L of water to form a biomass slurry in an approximate 60/40 blend. The slurry was blended for 5 minutes using an immersion blender to create a smooth, homogeneous mixture. The slurry was then pumped through a continuous subcritical water microwave assisted extraction unit and exposed to temperatures of 25-150° C. and a pressure of 200 psi for 30 seconds as the slurry passed through 4 microwave applicator modules of up to 3 kW microwave energy each, exposing the biomass to traveling wave within each applicator. The spent biomass was then separated from the solvent by hand using cheesecloth on a Buchner funnel under vacuum. The amount of bioactive agent at various timepoints was measured, as set forth in Table 1 below.

TABLE 1

Phenolic and Anthocyanin Recovery

| Temperature (0C) | Total Phenolics (mg/L GAE ± Std Error) | Anthocyanins (mg/L Cy-3 Glu Equiv ± Std Error) |
| --- | --- | --- |
| 25 | 374.13 ± 14.89 | 56.63 ± 7.86 |
| 60 | 804.19 ± 26.96 | 236.48 ± 24.40 |
| 110 | 1038.24 ± 15.22 | 310.64 ± 5.74 |
| 125 | 1751.67 ± 35.50 | 293.67 ± 6.83 |
| 140 | 1778.98 ± 23.20 | 280.62 ± 2.40 |

Figure 8A:
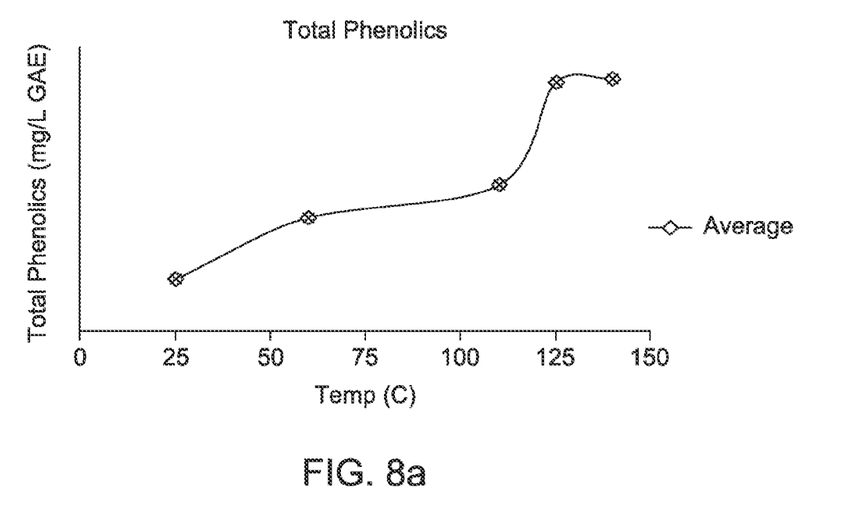
FIGS. 8a and 8b are line graphs illustrating the extraction of bioactive agents at various temperatures.
Figure 8B:
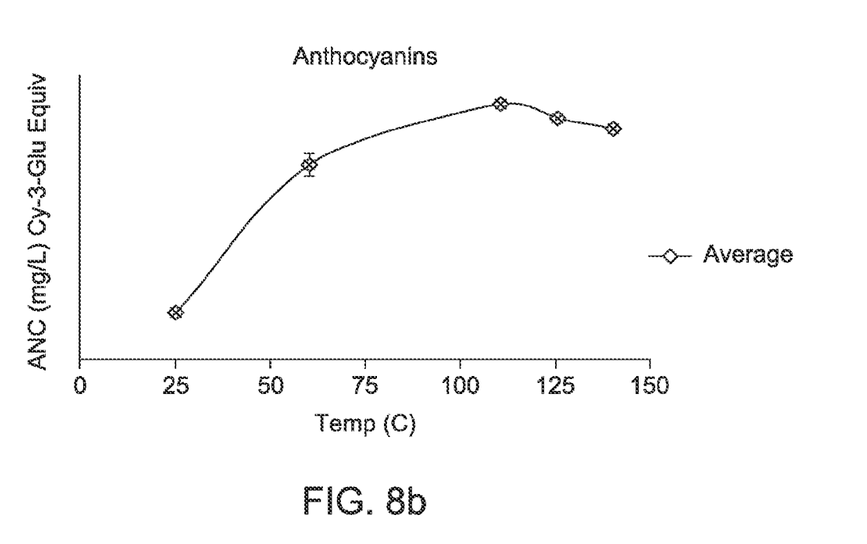

The data from Table 1 is represented graphically in FIG. 8a (total amount of phenolics recovered) and FIG. 8b (total amount of anthocyanins recovered).

The results indicate a peak anthocyanin extraction at 110° C. and a peak phenolic extraction at 140° C. under a constant pressure of 200 psi. The results indicate that subcritical microwave assisted extraction is effective in extracting phenolic acids and anthocyanins, and that extraction temperature can affect the bioactive extraction. It is appreciated that the results can differ depending on bioactive agent and/or solvent used. For example, fewer polar compounds (such as oils) could require higher temperatures, up to 190° C.

What is claimed is:

1. A method of extracting one or more bioactive agents from biomass, the method comprising:
blending the biomass and the one or more bioactive agents;
continuously passing the biomass though one or more microwave assisted extraction units, thereby exposing the biomass to microwave energy; and
separating the one or more bioactive agents from the biomass using the one or more microwave assisted extraction units that use the polarity of water in the subcritical range in lieu of chemical solvents to extract the one or more bioactive agents from the biomass.

2. The method of claim 1, wherein the one or more microwave assisted extraction units are constructed from rigid microwave transparent materials selected from ceramics, glass, TEFLON®, polyetherimide, polymethylpentene, polyetheretherketone, and combinations thereof.

3. The method of claim 1, wherein each microwave assisted extraction unit comprises at least one cylindrical, traveling wave, or modular microwave flow treatment devices.

4. The method of claim 1, wherein the one or more bioactive agents is water, acetic acid, innate liquid, ethanol, or combinations thereof.

5. The method of claim 1, wherein the ratio of solvent the one or more bioactive agents to biomass is about 1:10, 1:5, 1:4, 1:3, 1:2, or 1:1.

6. The method of claim 1, wherein the one or more bioactive agents are selected from one or more carotenoids, polyphenols, vitamins, flavonoids, isoflavones, curcuminoids, ceramides, proanthocyanidins, terpenoids, sterols, phytosterols, sterol esters, tocotrienols, squalenes, or retinoids.

7. The method of claim 1, wherein the biomass comprises agricultural crop wastes, crop residues, or combinations thereof.

8. The method of claim 1, wherein the separating comprises gravity filtration, vacuum filtration, syringe filtration, passing through a resin, or combinations thereof.

9. The method of claim 1, further comprising concentrating the one or more bioactive agents.

10. The method of claim 1, wherein one or more additives are added to the biomass before, after, or both before and after passing the biomass though a microwave assisted extraction module.

11. The method of claim 10, wherein the one or more additives are selected from acids, bases, salts, buffering systems, chelating agents, antioxidants, antimicrobial agents, or combinations thereof.

12. The method of claim 1, further comprising homogenizing the biomass.

13. A continuous microwave assisted extraction method comprising:
extracting one or more bioactive agents from biomass at one or more flow-through microwave processing units in lieu of chemical solvents, wherein at least one of the one or more flow-through microwave processing units is a subcritical water microwave assisted extraction unit that uses a polarity of water in a subcritical range, wherein the extraction system is configured to provide for continuous extraction.

14. The method of claim 13, extracting the one or more bioactive agents from the biomass includes exposing the biomass material to a temperature of about 120-190° C. and a pressure of about 50-200 psi.

15. The method of claim 13, wherein each flow-through microwave processing unit comprises at least one of: cylindrical, traveling wave, or modular microwave flow treatment devices.

16. The method of claim 13, wherein the flow-through microwave processing units are constructed from rigid microwave transparent materials selected from ceramics, glass, TEFLON®, polyetherimide, polymethylpentene, polyetheretherketone, and combinations thereof.

17. The method of claim 13, wherein the flow-through microwave processing units comprise at least one microwave energy generator.

18. The method of claim 13, further comprising testing pH, concentration, temperature, or combinations thereof.

* * * * *